3,267,125
COMPOUNDS CONTAINING ETHIONYLAMINO GROUPS AND PROCESS FOR PREPARING THEM
Rudolf Kühne, Fritz Meininger, and Siegfried Schiessler, Frankfurt am Main, Germany, assignors to Farbwerke Hoechst Aktiengesellschaft vormals Meister Lucius & Bruning, Frankfurt am Main, Germany, a corporation of Germany
No Drawing. Filed Jan. 9, 1962, Ser. No. 165,228
Claims priority, application Germany, Jan. 12, 1961, F 32,945
10 Claims. (Cl. 260—453)

This invention concerns a process for the manufacture of compounds containing 1–3 ethionylamino groups or N-alkyl- or N-phenyl-ethionyl-amino groups which in the form of their free acids correspond to the formula

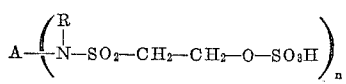

in which $n$ stands for one of the integers 1–3, preferably 1 or 2, A stands for a substituted or unsubstituted aromatic radical and R for a hydrogen atom, a phenyl group or an alkyl group having 1–4 carbon atoms, and the compounds prepared according to this process.

We have found that new compounds containing ethionylamino groups or N-alkyl- or N-phenyl-ethionylamino groups can be prepared by reacting carbyl sulfate with primary or secondary aromatic mono-, di- or triamines in an aqueous medium and in the presence of an acid-binding agent. This result is surprising in so far as carbyl sulfate, as is known, is rapidly destroyed by the action of water.

By compounds containing ethionylamino groups or N-alkyl- or N-phenyl-ethionylamino groups, there are to be understood those which in the form of the free acids correspond to the formula

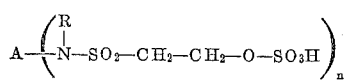

in which $n$ stands for one of the integers 1–3, preferably 1 or 2, A stands for a substituted or unsubstituted aromatic radical and R represents a hydrogen atom, a phenyl group or an alkyl group having 1–4 carbon atoms.

The aromatic radical in the above formula can belong to the benzene, naphthalene, diphenyl, diphenyl ether, diphenyl thioether, diphenylmethane, benzophenone, diphenylamine, diphenylsulfone, azobenzene or stilbene series and may contain any substitutent such as halogen atoms, alkyl, alkoxy, amino, hydroxy and nitro groups or especially groups imparting a solubility in water such as sulfonic acid or carboxylic acid groups.

As primary or secondary aromatic mono-, di- or triamines serving as starting material there may be mentioned, for example, 1-aminobenzene, 1-methylaminobenzene, 3-nitro-1-aminobenzene, 3-chloro-1-aminobenzene, furthermore toluidines, nitrotoluidines, aminophenols and aminophenol ethers. Furthermore, there may be used for the process of the present invention the amino or N-monoalkylamino derivatives of diphenylamine, diphenyl, diphenyl ether, diphenyl thioether, diphenyl-sulfone, stilbene, azobenzene, diphenylmethane such as 2,4,4′-triaminodiphenylmethane, and benzophenone. As examples for starting materials containing, in addition to any desired substituents, groups imparting solubility in water, there are mentioned aminobenzoic acid, aminobenzene-sulfonic acids, diaminobenzene-sulfonic acids, diamino-stilbene-disulfonic acid, aminonaphthalene-sufonic acids, hydroxyaminonaphthalene-sulfonic acids such for example, as 1-hydroxy-7-aminonaphthalene - 3 - sulfonic acid, 1-hydroxy-6-aminonaphthalene-3-sulfonic acid or 1-hydroxy-8-aminonaphthalene-3,6-disulfonic acid or the N-monoalkyl derivatives of these compounds.

For carrying out the process, the primary or secondary aromatic amines are either dissolved in water or, in case they are difficulty soluble or insoluble in water, emulsified or suspended in water in a fine state of subdivision and simultaneously mixed, while vigorously stirring, with pulverized carbyl sulfate and an acid-binding agent. Carbyl sulfate and acid-binding agent are added in a manner such that the reaction can take place in the neutral or weakly acid range at a pH of about 3 to 7.5 and a temperature of $-10°$ C. to $+50°$ C., preferably from $-10°$ C. to $+30°$ C. To the aqueous solution, emulsion, or suspension of the amine, there may be added an organic solvent, especially when using amines that are difficulty soluble or insoluble in water or when a reaction temperature below $0°$ C., for example from $-10°$ C. to $-5°$ C. shall be reached. As appropriate solvents there may be especially mentioned acetone, dioxane or tetrahydrofurane.

The process is not limited to the use of solid carbyl sulfate. With regard to a better dosing, the process can be modified in such a manner that a solution of carbyl sulfate in an organic solvent is used, such as methylene chloride, ethylene chloride, dichlorobenzene, nitrotoluene, nitroxylene, dioxane or acetonitrile solvents which are not miscible with water being preferred.

As acid-binding agents, there may be used alkali metal or alkaline earth metal hydroxides, borates and phosphates or tertiary organic bases such as pyridine or trialkylamines, more particularly alkali metal, alkaline earth metal or ammonium carbonates or hydrogencarbonates such as potassium hydrogencarbonate or calcium carbonate.

The products of the present invention are isolated by filtration and dried at a low temperature or, when they are easily soluble in water, by concentration or salting out with alkali metal chlorides.

According to the process of the present invention, the compounds containing several ethionylamino groups can be prepared in steps, for example by reacting an aromatic nitroamine with carbyl sulfate, reducing the aromatic nitro compound containing ethionylamino groups to obtain the free amine and reacting this amine again with carbyl sulfate.

The novel compounds obtainable by the process of the present invention are valuable intermediaries for the production of textile auxiliaries, pesticides and dyestuffs.

The following examples serve to illustrate the invention but they are not intended to limit it thereto, the parts being by weight unless otherwise stated and the relationship of parts by weight to parts by volume being the same as that of the kilogram to the liter.

*Example 1*

21.4 parts of N-methylaniline were emulsified in 50 parts by volume of water. 94 parts of pulverized carbyl sulfate were introduced into the emulsion within about 45 minutes at 0–7° C. By simultaneously adding a solution of 88.4 parts of potassium hydrogencarbonate in 265 parts by volume of water, the pH value of the reaction mixture was maintained at 3–4. After the addition of carbyl sulfate, the mixture stirred for further 30 minutes, the pH value was adjusted to 6 by means of a potassium hydrogencarbonate solution and the potassium salt of the N-methyl-N-ethionylaminobenzene was suction-filtered and dried at 40° C. under reduced pressure. After recrystallization from water, colorless columnar crystals were obtained which melted at 176–178° C.
$C_9H_{12}NO_6S_2K$—Calculated: N, 4.2; S, 19.2. Found: N, 4.2; S, 19.1.

Example 2

107 parts of N-methylaniline were emulsified in 750 parts by volume of water. At a reaction temperature of 0–5° C., a solution of 376 parts of carbyl sulfate in 1500 parts by volume of ethylene chloride was added within 90 minutes. By simultaneously adding a solution of 386 parts of potassium hydrogencarbonate in 1160 parts by volume of water, the pH of the reaction mixture was maintained at 4–5. The addition of carbyl sulfate being complete, the precipitated reaction product was suction-filtered and dried at 40° C. under reduced pressure. The potassium salt of the N-methyl-N-ethionyl-aminobenzene was obtained in a yield of more than 90% of the theory. After recrystallization from water, colorless columnar crystals were obtained which melted at 177–179° C.

$C_9H_{12}NO_6S_2K$—Calculated: N, 4.2; S, 19.2. Found: N, 4.3; S, 19.2.

Similar results were obtained when the reaction was carried out at a temperature of 20–25° C. or 40–45° C. instead of at 0–5° C.

Example 3

10.7 parts of N-methylaniline were emulsified in 100 parts by volume of water. Within 30 minutes, a solution of 37.6 parts of carbyl sulfate in 200 parts by volume of ethylene chloride was added at 0–5° C. By simultaneously adding a solution of 24 parts of potassium carbonate in 200 parts by volume of water, the pH of the reaction mixture was maintained at 4–5. The precipitated reaction product was suction-filtered and dried at 40° C. under reduced pressure. It was identical with the products described in Examples 1 and 2.

Instead of the potassium carbonate solution, a solution of 19 parts of sodium carbonate in 180 parts by volume of water or a suspension of 20 parts of calcium carbonate in 100 parts by volume of water could also be used.

Example 4

9.3 parts of aniline were emulsified in 100 parts by volume of water. Within 30 minutes, a solution of 37.6 parts of carbyl sulfate in 200 parts by volume of ethylene chloride was added at a reaction temperature of 0–5° C. By simultaneously adding a solution of 36.8 parts of potassium hydrogencarbonate in 110 parts by volume of water, the pH of the reaction mixture was maintained at 4–5.

When all was added, the precipitated product was suction-filtered and dried at 40° C. under reduced pressure.

The potassium salt of the N-ethionyl-aminobenzene obtained in a good yield precipitated after recrystallization from water in the form of colorless columnar crystals melting at 210–212° C.

$C_8H_{10}NO_6S_2K$—Calculated: N, 4.4; S, 20.0. Found: N, 4.4; S, 20.0.

Instead of 200 parts by volume of ethylene chloride, 500 parts by volume of o-dichlorobenzene could also be used.

Example 5

15.7 parts of 2-N-methylamino-naphthalene were emulsified in 100 parts by volume of water. At a reaction temperature of 20–25° C., a solution of 37.6 parts of carbyl sulfate in 200 parts by volume of ethylene chloride was added within 30 minutes. By simultaneously adding a solution of 32.4 parts of potassium hydrogencarbonate in 97 parts by volume of water, the pH of the reaction mixture was maintained at 4–5. When all was added, the precipitated product was suction-filtered and dried at 40° C. under reduced pressure.

The potassium salt of the 2-N-methyl-N-ethionyl-aminonaphthalene was obtained in a yield of more than 90% of the theory. After recrystallization from water, weakly yellowish crystals were obtained which melted at 212–214° C. with decomposition.

$C_{13}H_{14}NO_6S_2K$—Calculated: N, 3.7; S, 16.7. Found: N, 3.8; S, 16.3.

Example 6

15.2 parts of 3-nitro-N-methylaniline were emulsified in a mixture of 200 parts by volume of acetone and 200 parts by volume of water. At a reaction temperature of −10° C. to −5° C., a solution of 37.6 parts of carbyl sulfate in 200 parts by volume of ethylene chloride was added within 30 minutes. By simultaneously adding a solution of 31.2 parts of potassium hydrogencarbonate in 94 parts by volume of water, the pH of the reaction mixture was maintained at 4–5. The addition being finished, the precipitated product was suction-filtered and dried at 40° C. under reduced pressure. The potassium salt of the 3-nitro-N-methyl-N-ethionyl-aminobenzene was obtained in a good yield. When being recrystallized from water it formed slightly yellowish crystals, which melted with decomposition at 226–228° C.

$C_9H_{11}N_2O_8S_2K$—Calculated: N, 7.4; S, 16.9. Found: N, 7.4; S, 16.9.

When using instead of 15.2 parts of 3-nitro-N-methylaniline 13.8 parts of 3-nitroaniline, the potassium salt of the 3-nitro-N-ethionylamino-benzene was obtained in a good yield.

Example 7

12.1 parts of 2-N-methylamino-1-methylbenzene were emulsified in 100 parts by volume of water. At a reaction temperature of 0–5° C., a solution of 37.6 parts of carbyl sulfate in 200 parts by volume of ethylene chloride was added within 30 minutes. By simultaneously adding a solution of 35.3 parts of potassium hydrogencarbonate in 105 parts by volume of water, the pH of the reaction mixture was maintained at 4–5. The addition being complete, the precipitated product was suction-filtered and dried at 40° C. under reduced pressure.

The potassium salt of the 2-N-methyl-ethionyl-amino-1-methyl-benzene was obtained in a good yield and formed colorless crystals after being recrystallized from water. Melting point: 210–212° C.

$C_{10}H_{14}NO_6S_2K$—Calculated: N, 4.0; S, 18.4. Found: N, 3.9; S, 18.4.

Example 8

12.1 parts of 4-N-methylamino-1-methylbenzene were reacted with carbyl sulfate as described in Example 7. The potassium salt of the 4-N-methyl-N-ethionyl-amino-1-methylbenzene was obtained in a good yield and formed colorless crystals when being recrystallized from water. Melting point: 184–186° C.

$C_{10}H_{14}NO_6S_2K$—Calculated: N, 4.0; S, 18.4. Found: N, 4.0; S, 18.2.

Example 9

8.3 parts of 4-nitro-2-N-methylamino-1-methylbenzene were suspended in a mixture of 100 parts by volume of acetone and 100 parts by volume of water. At a reaction temperature of −5° C., a solution of 37.6 parts of carbyl sulfate in 200 parts by volume of ethylene chloride was added within 30 minutes. By simultaneously adding a solution of 64.6 parts of potassium hydrogencarbonate in 195 parts by volume of water, the pH of the reaction mixture was maintained at 4–5. When all was added, the precipitated product was suction-filtered and dried at 40° C. under reduced pressure. After recrystallization from water, colorless crystals of the 4-nitro-2-N-methyl-N-ethionyl-amino-1-methylbenzene were obtained which melted at 200–202° C. with decomposition.

$C_{10}H_{13}N_2O_8S_2K$—Calculated: N, 7.1; S, 16.3. Found: N, 7.1; S, 16.3.

Example 10

10.9 parts of 4-aminophenol were suspended in a mixture of 50 parts by volume of acetone and 50 parts by volume of water. At a temperature of 0–5° C., a solution of 37.6 parts of carbyl sulfate in 200 parts by volume of ethylene chloride was added within 30 minutes. By simultaneously adding a solution of 32.3 parts of potassium hydrogencarbonate in 97 parts by volume of water, the pH of the reaction mixture was maintained at 4–5. The precipitated reaction product was suction-filtered and dried at 40° C. under reduced pressure. The admixed 4-aminophenol was separated by extraction with acetone.

After recrystallization from water, the monopotassium salt of the 4-N-ethionylaminophenol was obtained in the form of lamelliform crystals melting at 220–222° C.

$C_8H_{10}NO_7S_2K$—Calculated: N, 4.2; S, 19.1. Found: N, 4.3; S, 19.2.

Example 11

16.9 parts of diphenylamine were suspended in 100 parts by volume of water. At a reaction temperature of 0–5° C., a solution of 37.6 parts of carbyl sulfate in 200 parts by volume of ethylene chloride was added within 30 minutes. By simultaneously adding a solution of 37 parts of potassium hydrogencarbonate in 110 parts by volume of water, the pH was maintained at 4–5. When all was added, the potassium salt of the N-ethionyldiphenylamine formed was suction-filtered and dried at 40° C. under reduced pressure. After recrystallization from water, colorless crystals were obtained which melted at 207–208° C. with decomposition.

$C_{14}H_{14}NO_6S_2K$—Calculated: N, 3.5; S, 16.2. Found: N, 3.5; S, 15.9.

Example 12

16.8 parts of 2-nitro-4-amino-1-methoxybenzene were suspended in 100 parts by volume of water. At a reaction temperature of 0–5° C., a solution of 37.6 parts of carbyl sulfate in 200 parts by volume of ethylene chloride was added within 30 minutes. By simultaneously adding a solution of 33.8 parts of potassium hydrogencarbonate in 100 parts by volume of water, the pH of the reaction mixture was maintained at 4–5. When all was added, the precipitated product was suction-filtered and dried at 40° C. under reduced pressure. Unreacted starting material which was still present could be removed by extraction with acetone.

The potassium salt of 2-nitro-4-N-ethionylamino-1-methoxybenzene was obtained in a good yield and, after recrystallization from water, formed yellow crystals melting at 224–226° C. with decomposition.

$C_9H_{11}N_2O_9S_2K$—Calculated: N, 7.1; S, 16.2. Found: N, 7.2; S, 16.0.

Example 13

13.7 parts of 3-aminobenzene-1-carboxylic acid were dissolved in a solution of 4 parts of sodium hydroxide in 300 parts by volume of water. At a reaction temperature of 0–5° C., 70 parts of pulverized carbyl sulfate were added within 30 minutes. The pH of the reaction mixture was maintained at 6–7 by simultaneously adding 65 parts of potassium hydrogencarbonate. The 3-aminobenzene-1-carboxylic acid was practically quantitatively converted into the dipotassium salt of the 3-N-ethionylaminobenzene-1-carboxylic acid.

Example 14

12.7 parts of 2-N-methylamino-8-hydroxynaphthalene-6-sulfonic acid were dissolved in a solution of 2 parts of sodium hydroxide in 200 parts by volume of water. At a reaction temperature of 0–5° C., 70 parts of pulverized carbyl sulfate were introduced within about 40 minutes. By simultaneously adding 70 parts of potassium hydrogencarbonate, the pH of the reaction mixture was maintained at 6–7. The solution of the dipotassium salt of the 2-N-methyl-N-ethionylamino-8-hydroxynaphthalene-6-sulfonic acid obtained in a very good yield could be further used without isolation of the easily soluble reaction product, for example for the preparation of azodyestuffs.

Example 15

12 parts of 2-amino-8-hydroxynaphthalene-6-sulfonic acid were dissolved in a solution of 2 parts of sodium hydroxide in 125 parts by volume of water. At a reaction temperature of 0–5° C., 70 parts of pulverized carbyl sulfate were introduced within 40 minutes. By simultaneously adding 70 parts of potassium hydrogencarbonate, the pH of the reaction mixture was maintained at 6–7. The mixture was after-stirred for 30 minutes, the precipitated reaction product was suction-filtered, washed with saturated potassium chloride solution and dried at 40° C. under reduced pressure. The dipotassium salt of the 2-N-ethionylamino-8-hydroxy-naphthalene-6-sulfonic acid was obtained in a very good yield.

Example 16

12.7 parts of 2-N-methylamino-5-hydroxynaphthalene-7-sulfonic acid were dissolved in a solution of 2 parts of sodium hydroxide in 125 parts by volume of water. At a reaction temperature of 0–5° C., 70 parts of pulverized carbyl sulfate were introduced. By simultaneously adding 70 parts of potassium hydrogencarbonate, the pH of the reaction mixture was maintained at 6–7. The mixture was after-stirred for 30 minutes, the precipitated product was suction-filtered, washed with a saturated potassium chloride solution and dried at 40° C. under reduced pressure. The dipotassium salt of the 2-N-methyl-N-ethionylamino-5-hydroxy-naphthalene-7-sulfonic acid was obtained in a very good yield.

Example 17

17.3 parts of 1-aminobenzene-3-sulfonic acid were dissolved in a solution of 5.6 parts of potassium hydroxide in 150 parts by volume of water. This solution was cooled to 0–5° C. and 100 parts of ice and 60 parts of sodium hydrogencarbonate were then added. 56.4 parts of pulverized carbyl sulfate were then added at once. The mixture was then stirred for one hour at a reaction temperature ranging from −4° C. to +5° C. The dipotassium salt of the N-thionylaminobenzene-3-sulfonic acid was obtained in a very good yield.

Example 18

17.3 parts of 1-aminobenzene-3-sulfonic acid were dissolved in a solution of 5.6 parts of potassium hydroxide in 250 parts by volume of water. At a reaction temperature ranging from 0–5° C., a solution of 60 parts of carbyl sulfate in 180 parts by volume of 2-nitrotoluene was added within 30 minutes. By simultaneously adding 54 parts of potassium hydrogencarbonate, the pH of the reaction mixture was maintained at 6–7. The dipotassium salt of the N-ethionylaminobenzene-3-sulfonic acid was obtained in a good yield.

Example 19

18.5 parts of 4,4′-diaminostilbene-2,2′-disulfonic acid were dissolved in a solution of 5.6 parts of potassium hydroxide in 200 parts by volume of water. At a reaction temperature of 0–5° C., 70 parts of pulverized carbyl sulfate were added within 30 minutes. The pH-value of the reaction mixture was maintained at 6–7 by simultaneously adding 70 parts of potassium hydrogencarbonate. After having stirred the mixture for 30 minutes, the precipitated product was suction-filtered and dried at 40° C. under reduced pressure. After recrystallization from aqueous ethanol, the tetrapotassium salt of the 4,4-di-N-ethionylaminostilbene-2,2′-disulfonic acid yielded slightly yellowish crystals which turned pink when exposed to light.

$C_{18}H_{18}N_2O_{18}S_6K_4$—Calculated: N, 3.1; S, 21.4. Found: N, 2.7; S, 21.7.

*Example 20*

18.5 parts of 4-amino-diphenyl ether were suspended in 150 parts by volume of water. At a reaction temperature of 0–5° C., a solution of 37.6 parts of carbyl sulfate in 200 parts by volume of ethylene chloride was added within 30 minutes. By simultaneously adding a solution of 40 parts of potassium hydrogencarbonate in 120 parts by volume of water, the pH-value of the mixture was maintained at 5–6. When all was added, the precipitated product was suction-filtered and dried at 40° C. under reduced pressure.

After recrystallization from water, the potassium salt of the 4-N-ethinoylamino-diphenyl ether was obtained in the form of colorless crystals melting at 211–213° C.

$C_{14}H_{14}NO_7S_2K$—Calculated: N, 3.4; S, 15.6. Found: N, 3.4; S, 15.6.

*Example 21*

19.7 parts of 4-amino-1,1'-azobenzene were suspended in 150 parts by volume of water. At a reaction temperature ranging from 5° C., a solution of 37.6 parts of carbyl sulfate in 200 parts by volume of ethylene chloride was added to the suspension within 30 minutes. By simultaneously adding a solution of 38 parts of potassium hydrogencarbonate in 120 parts by volume of water, the pH-value of the reaction mixture was maintained at 5–6. When all was added, the precipitated product was suction-filtered and dried at 40° C. under reduced pressure. After recrystallization from aqueous ethanol, the potassium salt of the 4-N-ethionyl-amino-1,1'-azobenzene was obtained in the form of orange crystals.

*Example 22*

14.9 parts of N-n-butylaniline were emulsified in 100 parts by volume of water. At a reaction temperature ranging from 0–5° C., a solution of 37.6 parts of carbyl sulfate in 200 parts by volume of ethylene chloride was added within 30 minutes. By simultaneously adding a solution of 36.8 parts of potassium hydrogencarbonate in 115 parts by volume of water, the pH-value of the reaction mixture was maintained at 4–5. When all was added, the precipitated product was suction-filtered and dried at 40° C. under reduced pressure. The potassium salt obtained in a good yield was recrystallized from water and formed colorless crystals.

$C_{12}H_{18}NO_6S_2K$—Calculated: N, 3.7; S, 17.1. Found: N, 3.8; S, 16.4.

*Example 23*

17.3 parts of 1-aminobenzene-2-sulfonic acid were dissolved in a solution of 5.6 parts of potassium hydroxide in 250 parts by volume of water. At a reaction temperature ranging from 0–5° C., 140 parts of pulverized carbyl sulfate were added within one hour. The pH-value of the reaction mixture was maintained at 5–7 by simultaneously adding 140 parts of potassium hydrogencarbonate. After having stirred the mixture for 30 minutes, the precipitated product was suction-filtered, washed with a saturated potassium chloride solution and dried at 40° C. under reduced pressure. After recrystallization from water, the dipotassium salt of the N-ethionylamino-benzene-2-sulfonic acid precipitated in the form of colorless crystals.

$C_8H_9NO_9S_3K_2$—Calculated: N, 3.2; S, 22.0. Found: N, 3.1; S, 22.4.

*Example 24*

18.8 parts of 1,4-diaminobenzene-2-sulfonic acid were dissolved in a mixture of 50 parts by volume of 2 N-sodium hydroxide solution and 100 parts by volume of water. The solution was cooled to 0° C., 150 parts of ice and 70 parts of sodium hydrogencarbonate were then added and, while intensely stirring, 80 parts of pulverized carbyl sulfate were introduced within 3 minutes. The mixture was after-stirred for one hour at 0–5° C. The disodium salt of the 1-amino-4-N-ethionylaminobenzene-2-sulfonic acid was obtained in a good yield.

When using instead of 18.8 parts of 1,4-diaminobenzene-2-sulfonic acid, 18.8 parts of 1,3-diaminobenzene-4-sulfonic acid, the disodium salt of the 1-amino-3-N-ethionylaminobenzene-6-sulfonic acid was obtained.

*Example 25*

23.9 parts of 1-amino-5-hydroxynaphthalene-7-sulfonic acid were dissolved in a mixture of 10 parts by volume of 14 N-ammonia and 75 parts by volume of water. The solution was cooled to 0° C. 150 parts of ice and 80 parts of ammonium hydrogencarbonate were then added and, while intensely stirring, 80 parts of pulverized carbyl sulfate were introduced within 4 minutes. The mixture was after-stirred for one hour at 0–5° C. The diammonium salt of the 1-N-ethionylamino-5-hydroxynaphthalene-7-sulfonic acid was obtained in a good yield.

*Example 26*

95.6 parts of 2-amino-5-hydroxynaphthalene-7-sulfonic acid were dissolved in 400 parts by volume of 1 N-potassium hydroxide solution. The solution was cooled to 0° C. 400 parts of ice and 300 parts of potassium hydrogencarbonate were then added and, while intensely stirring, 300 parts of pulverized carbyl sulfate were then introduced within 10 minutes. The mixture was after-stirred for one hour at 0–5° C. The dipotassium salt of the 2-N-ethionylamino-5-hydroxynaphthalene-7-sulfonic acid was obtained in a very good yield.

We claim:

1. A compound selected from the group consisting of sodium, potassium, calcium, and ammonium salts of acids of the formula,

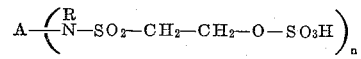

wherein $n$ is an integer from 1 to 3, R is selected from the group consisting of hydrogen, phenyl, and alkyl having 1–4 carbon atoms, and A is a member selected from the group consisting of carboxy phenyl, phenyl sulfonic acid, naphthyl sulfonic acid, stilbene disulfonic acid, hydroxy naphthyl sulfonic acid, hydroxy naphthyl disulfonic acid, amino phenyl sulfonic acid, and amino stilbene disulfonic acid.

2. The compound of the formula

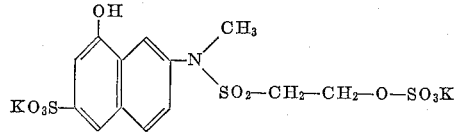

3. The compound of the formula

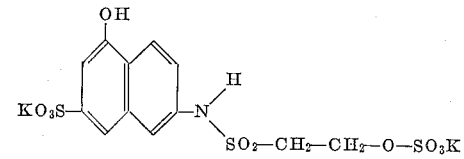

4. The compound of the formula

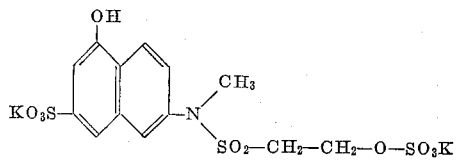

5. The compound of the formula

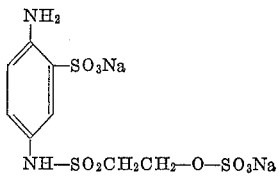

6. The compound of the formula

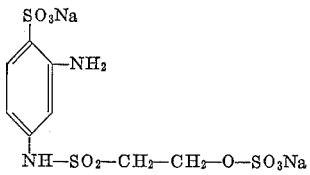

7. A process for preparing compounds selected from the group consisting of alkali metal salts, alkaline earth metal salts, and ammonium salts of acids of the formula

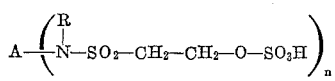

wherein $n$ is an integer from 1 to 3, R is selected from the group consisting of hydrogen, phenyl, and alkyl having 1-4 carbon atoms, and A is selected from the group consisting of phenyl, naphthyl, diphenyl, diphenyl ether, diphenyl thioether, diphenyl sulfone, stilbene, azobenzene, diphenyl methane, benzophenone, and mono- and di-substituted carboxy, sulfonic acid, chloro, alkyl, alkoxy, hydroxy, amino, and nitro derivatives thereof, which process comprises reacting carbyl sulfate and an amine of the formula

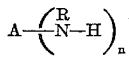

wherein $n$, R, and A are defined as above, in an aqueous medium at a pH of from about 3 to 7.5 and at a temperature of from $-10°$ C. to $50°$ C. in the presence of an acid binding agent selected from the group consisting of the carbonates and hydrogen carbonates of alkali-metals, alkaline earth metals, and ammonium.

8. A process as in claim 7 wherein said carbyl sulfate is used in solid form.

9. A process as in claim 7 wherein said carbyl sulfate is used as a solution in a water-immiscible solvent selected from the group consisting of methylene chloride, ethylene chloride, dichlorobenzene, nitrotoluene, and nitroxylene.

10. A process as in claim 7 wherein a water-miscible solvent selected from the group consisting of acetone, dioxan, tetrahydrofuran, and acetonitrile is present in said aqueous medium.

References Cited by the Examiner
UNITED STATES PATENTS 2,666,788  1/1954  Ebel.
3,163,667  12/1964  Klass et al. _____ 260—458

FOREIGN PATENTS 686,061  1/1953  Great Britain.

OTHER REFERENCES

Beilstein, "Handbuch der Organische Chemie," vol. 19, page 433 (1934).

Houben-Weyl, "Methoden der Organischen Chemie," vol. 9, page 616 (1955).

CHARLES B. PARKER, *Primary Examiner.*

IRVING MARCUS, *Examiner.*

S. H. LIEBERSTEIN, FLOYD HIGEL,
*Assistant Examiners.*